US012589621B2

(12) United States Patent
Poynor et al.

(10) Patent No.: US 12,589,621 B2
(45) Date of Patent: Mar. 31, 2026

(54) HIGH ARTICULATION TOWING RECEIVER

(71) Applicant: MSI Defense Solutions, LLC, Mooresville, NC (US)

(72) Inventors: Raymond Poynor, Mooresville, NC (US); Johnathon Alan Lewchuk, Charlotte, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 494 days.

(21) Appl. No.: 18/187,479

(22) Filed: Mar. 21, 2023

(65) Prior Publication Data

US 2023/0294464 A1 Sep. 21, 2023

Related U.S. Application Data

(60) Provisional application No. 63/321,788, filed on Mar. 21, 2022.

(51) Int. Cl.
B60D 1/167 (2006.01)
B60D 1/52 (2006.01)

(52) U.S. Cl.
CPC ................ B60D 1/167 (2013.01); B60D 1/52 (2013.01)

(58) Field of Classification Search
CPC .................................. B60D 1/167; B60D 1/52
See application file for complete search history.

(56) References Cited

U.S. PATENT DOCUMENTS

| | | |
|---|---|---|
| 4,711,461 A | 12/1987 | Fromberg |
| 5,765,851 A | 6/1998 | Parent |
| 7,837,216 B1 * | 11/2010 | Greaves, Jr. ............. B60D 1/54 |
| | | 280/491.4 |
| 8,240,696 B1 | 8/2012 | Miller et al. |
| 8,505,952 B1 | 8/2013 | Choquette |
| 8,567,807 B2 * | 10/2013 | Su ............................ B60D 1/54 |
| | | 280/491.1 |
| 2008/0247836 A1 | 10/2008 | Erb et al. |
| 2012/0235381 A1 | 9/2012 | Wulff |
| 2019/0225036 A1 * | 7/2019 | Westervelt ............... B60D 1/56 |
| 2019/0263203 A1 | 8/2019 | Perotti |
| 2021/0061031 A1 | 3/2021 | Larson et al. |
| 2021/0291599 A1 | 9/2021 | Bowe et al. |

OTHER PUBLICATIONS

International Search Authority, "International Search Report", PCT/US2023/15821, mailed Jun. 23, 2023.
International Search Authority, "Written Opinion", PCT/US2023/15821, mailed Jun. 23, 2023.

* cited by examiner

*Primary Examiner* — Kevin Hurley

(74) *Attorney, Agent, or Firm* — Jeffrey C. Watson, Esq.; Grell & Watson Patent Attorneys LLC

(57) ABSTRACT

A high articulation towing receiver includes a housing and a receiver piece. The housing has a hitch component on a front end and an opening on a back end. The receiver piece includes a hitch receiver portion on a first end and a rotational component on a second end. The rotational component of the receiver piece is positioned inside of the opening on the back end of the housing, where the rotational component is configured to rotate within the housing. Wherein, the rotational component is configured to rotate within the housing for providing a first range of motion about a central longitudinal axis of the receiver piece.

21 Claims, 15 Drawing Sheets

HIGH ARTICULATION TOWING RECEIVER

CROSS-REFERENCE TO RELATED APPLICATIONS

This application claims benefit to U.S. Provisional Patent Application No. 63/321,788 filed on Mar. 21, 2022, entitled "HIGH ARTICULATION TOWING RECEIVER", which is incorporated by reference in its entirety.

FIELD OF THE DISCLOSURE

The present disclosure relates to towing vehicles. More specifically, the present disclosure relates to a high articulation towing receiver configured for towing vehicles.

BACKGROUND

Generally speaking, a tow hitch, also known as a tow bar or trailer hitch, is a device attached to the chassis of a vehicle for towing. Generally, most tow hitches include some form of a tow ball to allow swiveling and articulation of a trailer. To tow safely, the correct combination of vehicle and trailer must be combined with correct loading horizontally and vertically on the tow ball. Trailer hitches for conventional passenger cars, light-duty commercial vehicles, light trucks, and multipurpose passenger vehicles come in two main OEM or aftermarket types: receiver and bumper/fixed-drawbar. The instant disclosure may be directed toward a receiver type tow hitch, but may not be so limited, and could be used for other various tow hitches including bumper/fixed-drawbar.

Receiver-type hitches consist of a portion with a rearward-facing opening that accepts removable aftermarket hitch-mounted accessories: trailer hitch ball mounts, hitch bike racks, cargo carriers, etc. A receiver hitch can accommodate a variety of different tow hitches when the tow hook/ball may be attached via a receiver tube attached to the tow vehicle. Trailer hitch receiver tubes may be bolted, welded, or integral to the vehicle chassis, and come in various sizes depending on the load they are designed to carry and the country of operation. The US standards are: Class I & II—1+¼ in (31.8 mm) light or medium duty[4] receiver tube; Class III & IV—2 in (50.8 mm) heavy duty[4] receiver tube; and Class V—2 or 2+½ in (50.8 or 63.5 mm) receiver tube.

Although the standard ball and hitch receiver allows swiveling and articulation of a trailer about the ball in a planar horizontal direction, the instant disclosure recognizes the need in hitch receivers to provide some range of movement about the vertical direction and/or additional rotational range of motion. The instant disclosure recognizes that this range of movement about the vertical direction and/or rotational range of motion may be especially desirable when towing a vehicle. As such, the purpose of the disclosed high articulation towing receiver assembly may be to solve the limitation of a standard hitch receiver, wherein the towed vehicle has a minimal range of motion when coupled with a tow vehicle. For example, when towing a vehicle over undulating services, like off-road environments, the standard hitch receiver with no range of movement about the vertical direction and limited rotational range of motion often leads to stresses and failures in towing equipment, like when utilizing a tow bar in off-road situations. In these types of off-road environments, the torsional forces applied to the tow bar from the towing vehicle being on one axis or plain, and the towed vehicle being on another axis or plane can create extreme torsional forces on the tow bar which may lead to stresses and eventual failure of the tow bar and/or attaching equipment.

As a result, the instant disclosure may be designed to address at least certain aspects of the problems or needs discussed above by providing a high articulation towing receiver.

SUMMARY

The present disclosure may solve the aforementioned limitations of the currently available towing receivers, by providing a high articulation towing receiver. The high articulation towing receiver may generally include a housing and a receiver piece. The housing may have a hitch component on a front end and an opening on a back end. The receiver piece may include a hitch receiver portion on a first end and a rotational component on a second end. The rotational component of the receiver piece may be positioned inside of the opening on the back end of the housing. The rotational component may be configured to rotate within the housing. Wherein, the rotational component may be configured to rotate within the housing for providing a first range of motion about a central longitudinal axis of the receiver piece.

In select embodiments of the disclosed high articulation towing receiver, the housing may include a two-piece assembly. The two-piece assembly may have a left housing side piece and a right housing side piece. The left housing side piece and the right housing side piece may be attached together. In select embodiments, the two-piece assembly of the housing including four socket head cap screws and four nylon lock nuts configured to secure the left housing side piece to the right housing side piece with the rotational component secured inside of the opening on the back end of the housing.

One feature of the disclosed high articulation towing receiver may be that the housing can be made from a high strength aluminum material.

Another feature of the disclosed high articulation towing receiver may be that the hitch component on the front end of the housing may include a first clamshell clevis hitch. The first clamshell clevis hitch may include a first removable clevis pin. In select embodiments, the first removable clevis pin may include a first diameter that may be 1 inch. In other select embodiments, the first removable clevis pin may be made from a steel material.

In select embodiments of the disclosed high articulation towing receiver a double clevis connector piece may be included. The double clevis connector piece may have a proximal end and a distal end. The double clevis connector piece may include a connector hole on the proximal end. The connector hole may be configured to receive the first removable clevis pin for rotatable attachment to the front end of the housing. A second clamshell clevis hitch may be on the distal end of the double clevis connector piece. The second clamshell clevis hitch may include a second removable clevis pin. The second clamshell clevis hitch may be configured for attachment of the high articulation towing receiver to a tow bar assembly, or the like, via the second removable clevis pin. The second removable clevis pin may include a second diameter that may be 1 inch. The second removable clevis pin may be made from a steel material. The double clevis connector piece may be configured to position the second removable clevis pin perpendicular to the first removable clevis pin. Wherein, the double clevis connector piece may be configured to provide a second range of motion about the first removable clevis pin. The double clevis connector piece may also be configured to provide a third range of motion about the second removable clevis pin.

One feature of the disclosed high articulation towing receiver may be that it can be configured to provide the first range of motion directed along a vehicle's longitudinal axis, the second range of motion about the first removable clevis pin, and the third range of motion about the second removable clevis pin. Whereby, a vehicle being towed can articulate across a laterally severe and uneven terrain without inducing stress and strain on either the vehicle being towed or a towing vehicle.

In select embodiments, the high articulation towing receiver may be configured to provide a roll rotation, a yaw rotation, and a pitch rotation. The roll rotation may be about the central longitudinal axis of the receiver piece. As such, this roll rotation may be provided by the first range of motion of the rotational component of the receiver piece rotating within the housing. The yaw rotation may be along a longitudinal vertical plane of the towing vehicle. As such, this yaw rotation may be provided by the second range of motion about the first removable clevis pin or via the third range of motion about the second removable clevis pin for movements side to side of the vehicle being towed (depending on the orientation of the rotational component within the housing). The pitch rotation may be along a longitudinal horizontal plane of the towing vehicle via the second range of motion about the first removable clevis pin or via the third range of motion about the second removable clevis pin for movements up and down of the vehicle being towed (depending on the orientation of the rotational component within the housing). In select embodiments, the high articulation towing receiver may provide an unlimited roll rotation, at least 100 degrees of the yaw rotation, at least 100 degrees of the pitch rotation, and/or combinations thereof. In select possibly preferred embodiments, the high articulation towing receiver may provide an unlimited roll rotation, at least 200 degrees of the yaw rotation, at least 200 degrees of the pitch rotation, and/or combinations thereof.

In select embodiments of the disclosed high articulation towing receiver a first lanyard may be included. The first lanyard may be attached on a side of the housing. The first lanyard may be configured to be attached to the first removable clevis pin for preventing the first removable clevis pin from being lost when removed.

In select embodiments of the disclosed high articulation towing receiver a second lanyard may be included. The second lanyard may be attached to a top handle on the second removable clevis pin. The second lanyard may be configured to be attached to a cottar pin on the second removable clevis pin to prevent the cottar pin from being lost when removed.

Another feature of the disclosed high articulation towing receiver may be that the opening on the back end of the housing is in communication with an interior of the housing. The interior of the housing may include a locating feature shape configured to accurately encapsulate the rotational component of the receiver piece and a bearing assembly.

Another feature of the disclosed high articulation towing receiver may be that the bearing assembly may be configured to support axial and tension loads imparted on the high articulation towing receiver.

Another feature of the disclosed high articulation towing receiver may be that the bearing assembly may be configured for support of compressive load of the high articulation towing receiver.

In select embodiment of the high articulation towing receiver, the bearing assembly may include a split composite bearing. The split composite bearing may be configured to support axial and tension loads imparted on the high articulation towing receiver.

In select embodiment of the high articulation towing receiver, the bearing assembly may include a composite planar bearing disc. The composite planar bearing disc may be configured for support of compressive load of the high articulation towing receiver.

In other select embodiments of the high articulation towing receiver, the bearing assembly may include a split composite bearing and a composite planar bearing disc. The split composite bearing may be configured to support axial and tension loads imparted on the high articulation towing receiver. The composite planar bearing disc may be configured for support of compressive load of the high articulation towing receiver. Wherein, the bearing assembly may be configured to function effectively in dirty, sandy environments without the need for cleaning, greasing or any means of lubrication. Whereby, the bearing assembly may be configured to act as a low friction, high strength rotational support for the high articulation towing receiver.

In select embodiments of the disclosed high articulation towing receiver, the rotational component of the receiver piece may include a first rotating diameter section, a second rotating diameter section, and a third rotating diameter section. The first rotating diameter section may step down into the second rotating diameter section. The second rotating diameter section may step up into the third rotating diameter section. Wherein, the second rotating diameter section may be smaller than the first rotating diameter section and the third rotating diameter section.

In select embodiments of the disclosed high articulation towing receiver, the bearing assembly may include a first bearing diameter section, a second bearing diameter section, and a third bearing diameter section. The first bearing diameter section may step down into the second bearing diameter section. The second bearing diameter section may step up into the third bearing diameter section. Wherein, the second bearing diameter section may be smaller than the first bearing diameter section and the third bearing diameter section. The first bearing diameter section and the second bearing diameter section may be positioned around the second rotating diameter section. The third bearing diameter section may be positioned around the third rotating diameter section.

In select embodiments of the disclosed high articulation towing receiver, the opening on the housing may include a first opening diameter section. The first opening diameter section may secure the first bearing diameter section around the second rotating diameter section.

In select embodiments of the disclosed high articulation towing receiver, the first rotating diameter section of the rotational component may be sized larger than the opening on the housing and may be positioned outside of the opening on the housing.

In select embodiments of the disclosed high articulation towing receiver, the interior of the housing may include a second opening diameter section and a third opening diameter section. The second opening diameter section may be stepped in from the first opening diameter section in the opening. The third opening diameter section may be stepped out from the second opening diameter section. The second opening diameter section may secure the second bearing diameter section around the second rotating diameter section. The third opening diameter section may secure the third bearing diameter section around the third rotating diameter section.

Another feature of the disclosed high articulation towing receiver may be that the receiver piece can be made from a high strength Cr—Mo steel material.

Another feature of the disclosed high articulation towing receiver may be that the hitch receiver portion of the receiver piece may be configured to be inserted and secured into a receiver tube, like any standard receiver tube, any custom receiver tube, or the like. As an example, and clearly not limited thereto, the hitch receiver portion of the receiver piece may include a 2-inch square shape configured to be inserted into a standard 2-inch receiver tube.

In use, the high articulation towing receiver may be configured to function maintenance free with no bearing requiring lubrication or regular cleaning and grease to prevent premature wear and failure.

In use, the high articulation towing receiver may be configured to withstand extremely high tensile and compressive forces by virtue of a stepped rotational component as part of a high strength steel receiver and an accompanying high strength composite bearing.

In use, the high articulation towing receiver may be configured to connect with towed vehicles and trailers through a quick-pin clevis connection, the quick-pin clevis connection is configured to allow connection to a variety of tow bar adapters to increase the towed vehicle degrees of freedom required for a particular towing application.

In another aspect, the instant disclosure embraces the high articulation towing receiver in any embodiment and/or combination of embodiments shown and/or described herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
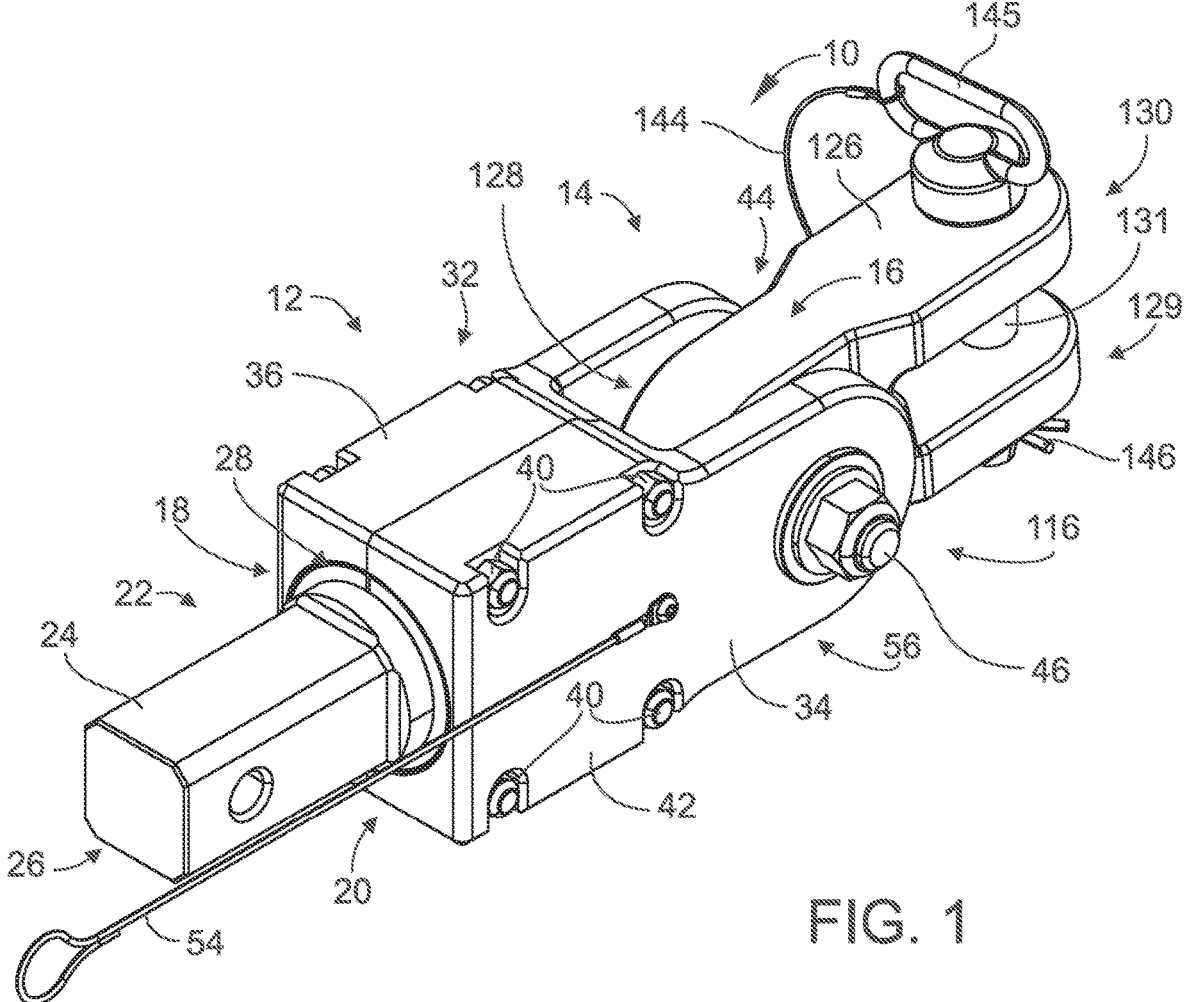
FIG. 1 is a rear, top, left perspective view of the disclosed high articulation towing receiver according to select embodiments of the instant disclosure.
Figure 2:
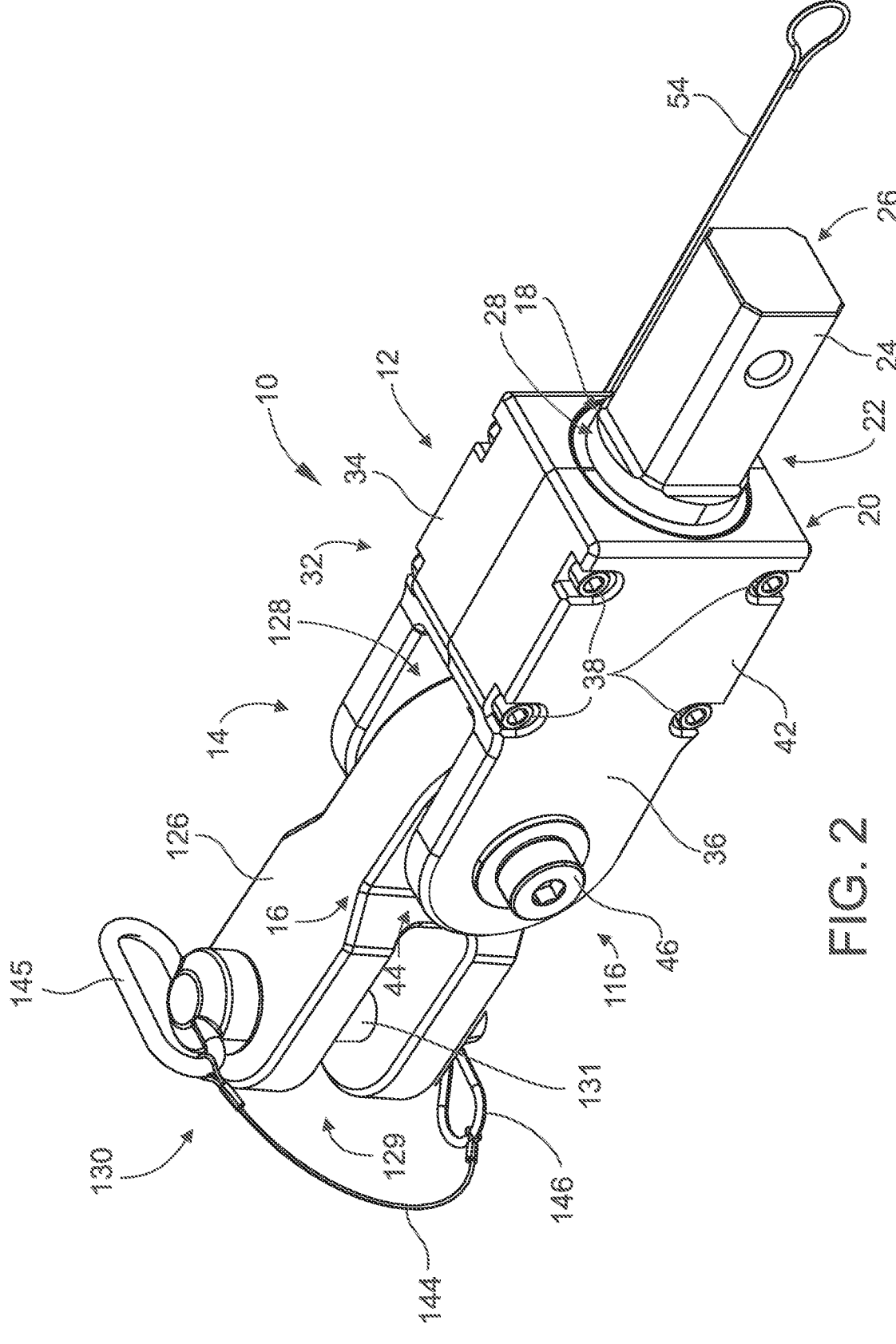
FIG. 2 is a rear, top, right perspective view of the high articulation towing receiver from FIG. 1.
Figure 3:
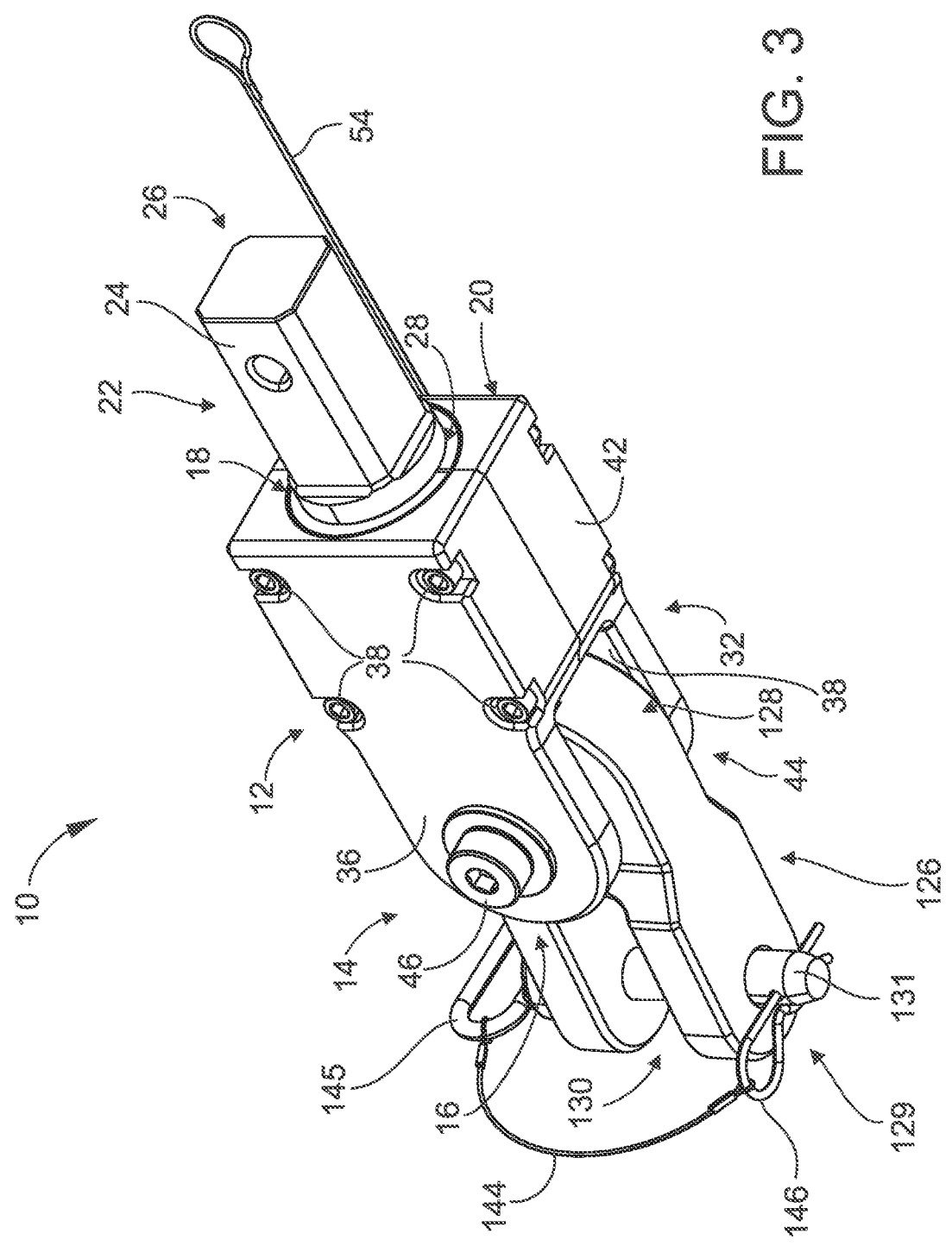
FIG. 3 is a rear, bottom, right perspective view of the high articulation towing receiver from FIG. 1.
Figure 4:
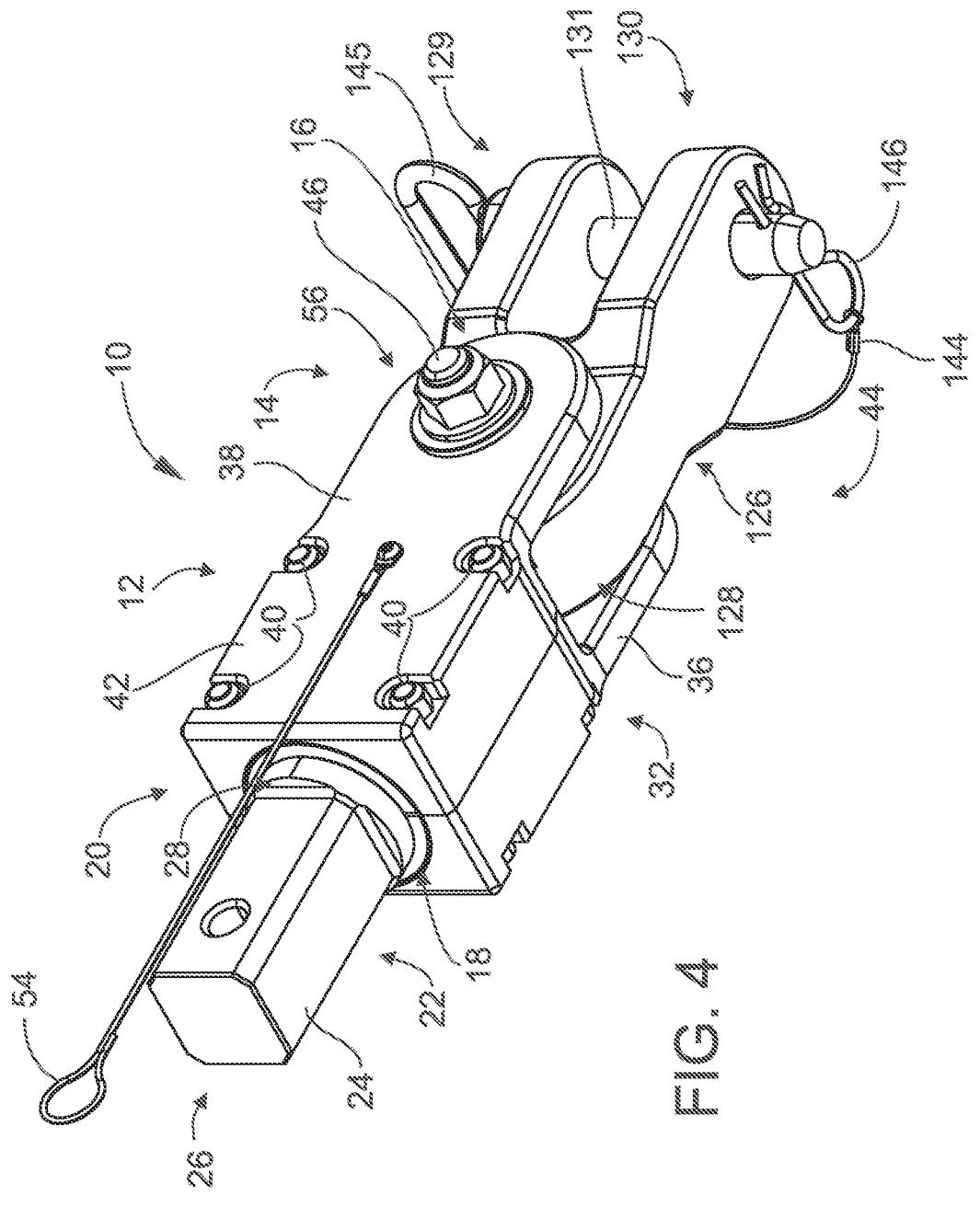
FIG. 4 is a rear, bottom left perspective view of the high articulation towing receiver from FIG. 1.
Figure 5:
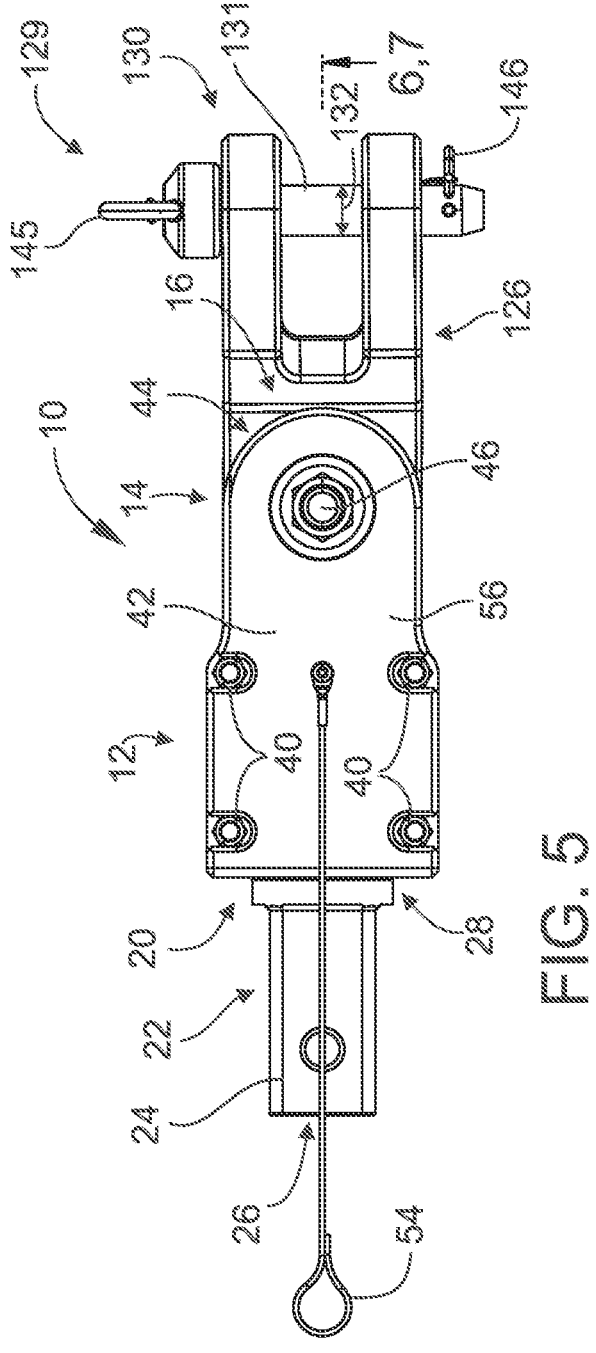
FIG. 5 is a left side view of the high articulation towing receiver from FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-14, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring to FIGS. 1-8, the present disclosure may solve the aforementioned limitations of the currently available towing receivers and devices, by providing high articulation towing receiver 10. High articulation towing receiver 10 may generally include housing 12 and receiver piece 22. Housing 12 may have hitch component 14 on front end 16 and opening 18 on back end 20. Receiver piece 22 may include hitch receiver portion 24 on first end 26 and rotational component 28 on second end 30. Rotational component 28 of receiver piece 22 may be positioned inside of opening 18 on back end 20 of housing 12. Rotational component 28 may be configured to rotate within housing 12. Rotational component 28 may be configured to rotate within housing 12 for providing first range of motion 124 (see FIGS. 12F, 13A, 13B, 13C, 14A, 14B and 14C) about central longitudinal axis 125 of receiver piece 22. As a result, high articulation towing receiver 10 may be designed and configured with an ability to provide complete rotation along the vehicle's longitudinal axis 104, so that vehicle being towed 106 can articulate across laterally severe and uneven terrain 108 without inducing stress and strain on either vehicle being towed 106 or towing vehicle 110.

Figure 6:
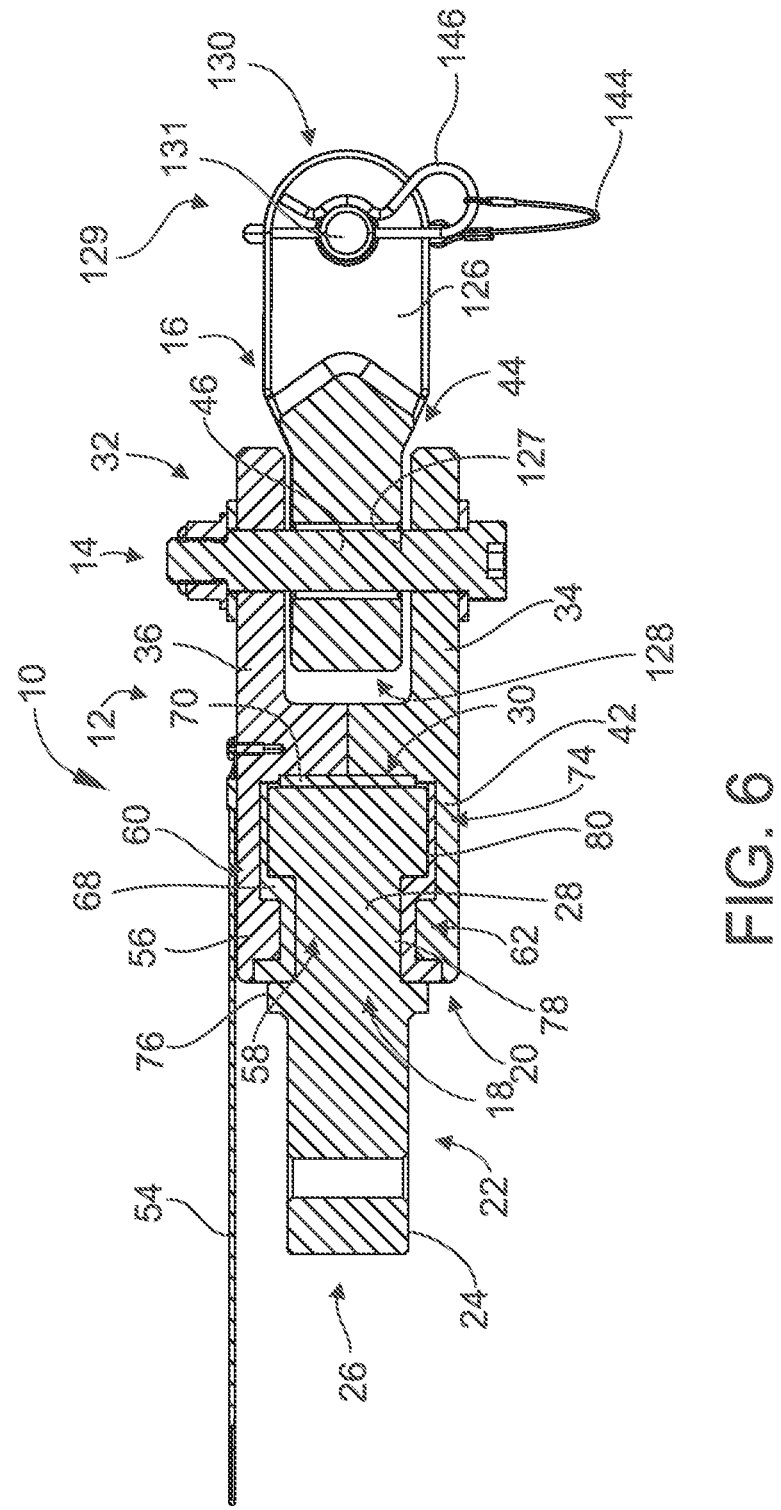
FIG. 6 is a bottom cross-sectional view of the top half of the high articulation towing receiver from FIG. 1 as taken from the cross-sectional view shown in FIG. 5.
Figure 7:
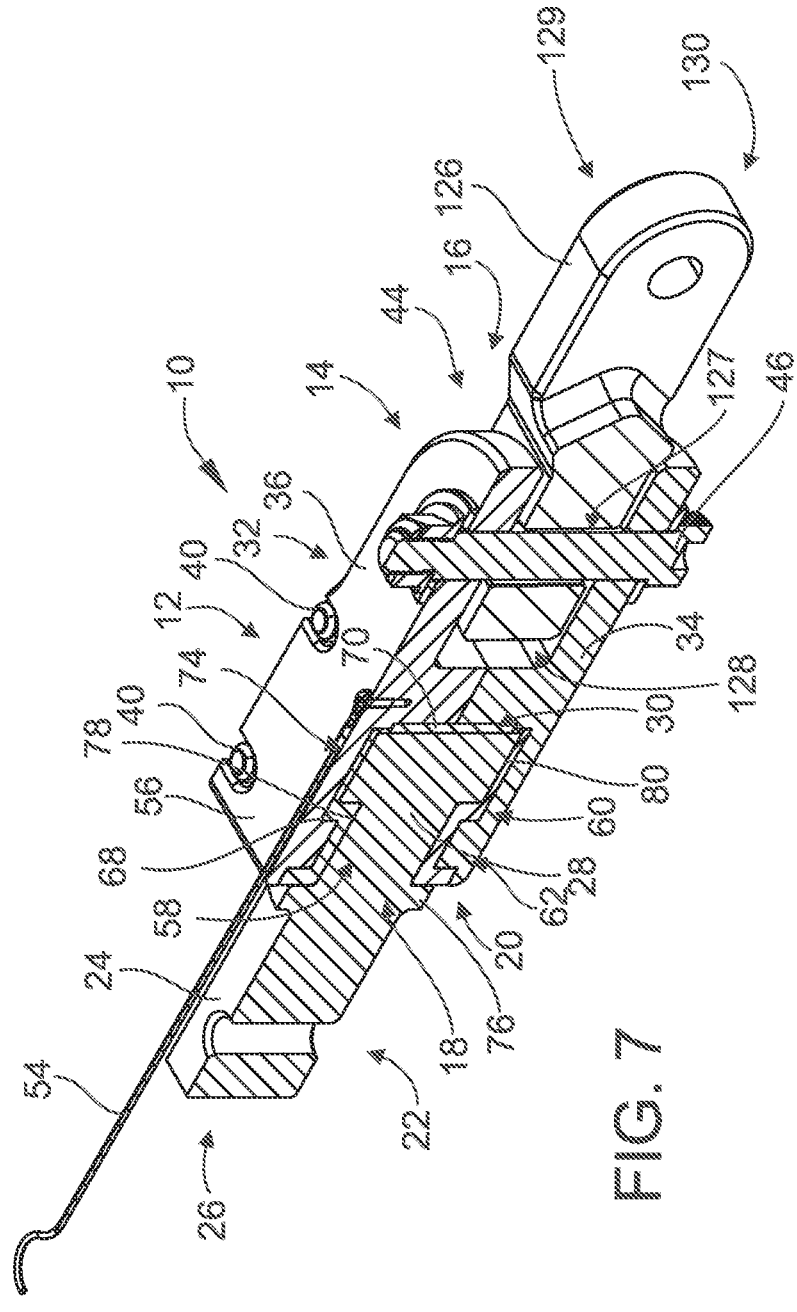
FIG. 7 is a front, bottom, right perspective view of the cross-sectional view of the high articulation towing receiver as shown in FIG. 6.
Figure 8:
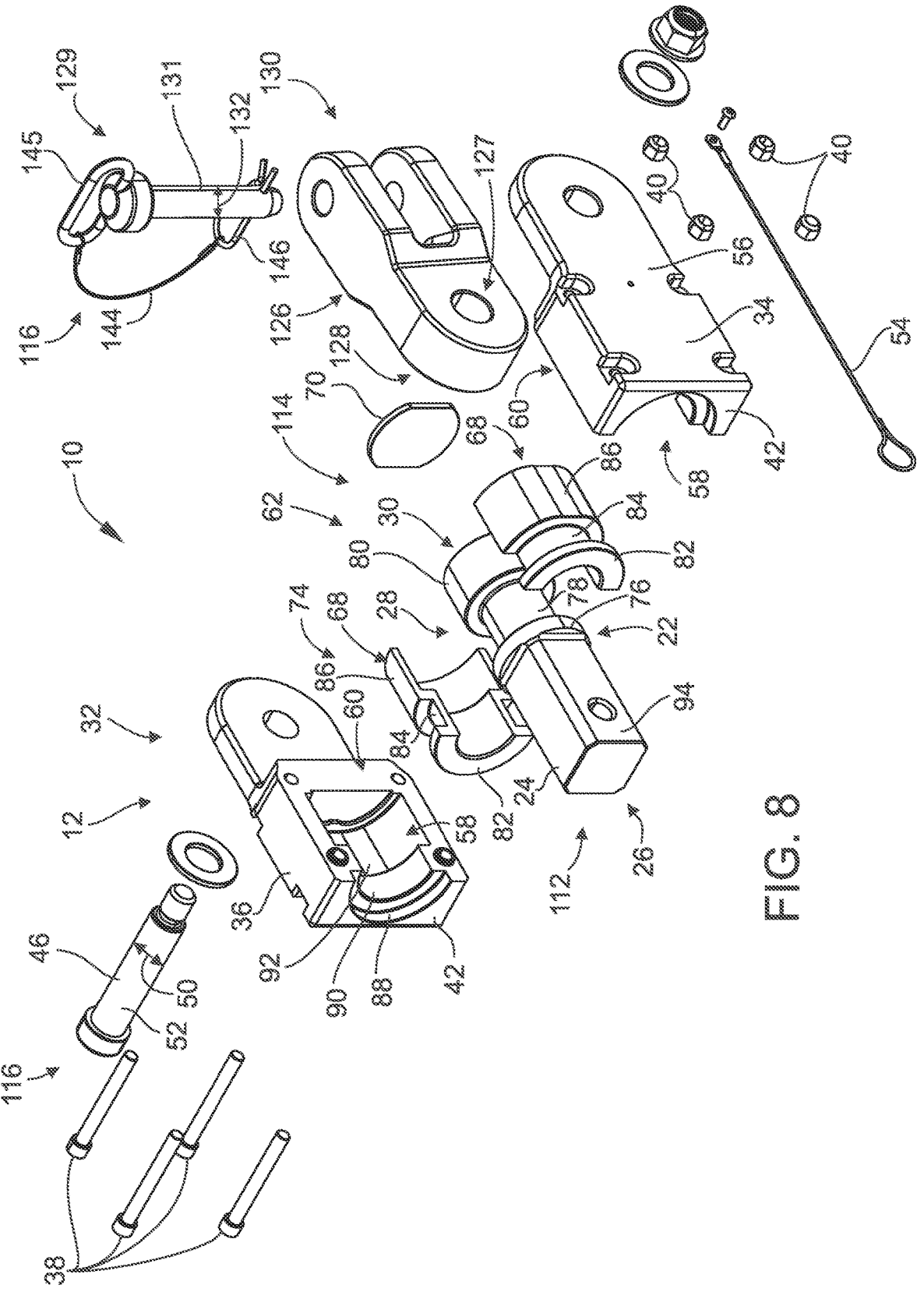
FIG. 8 is a partially disassembled perspective view of the high articulation towing receiver from FIG. 1.
Figure 9:
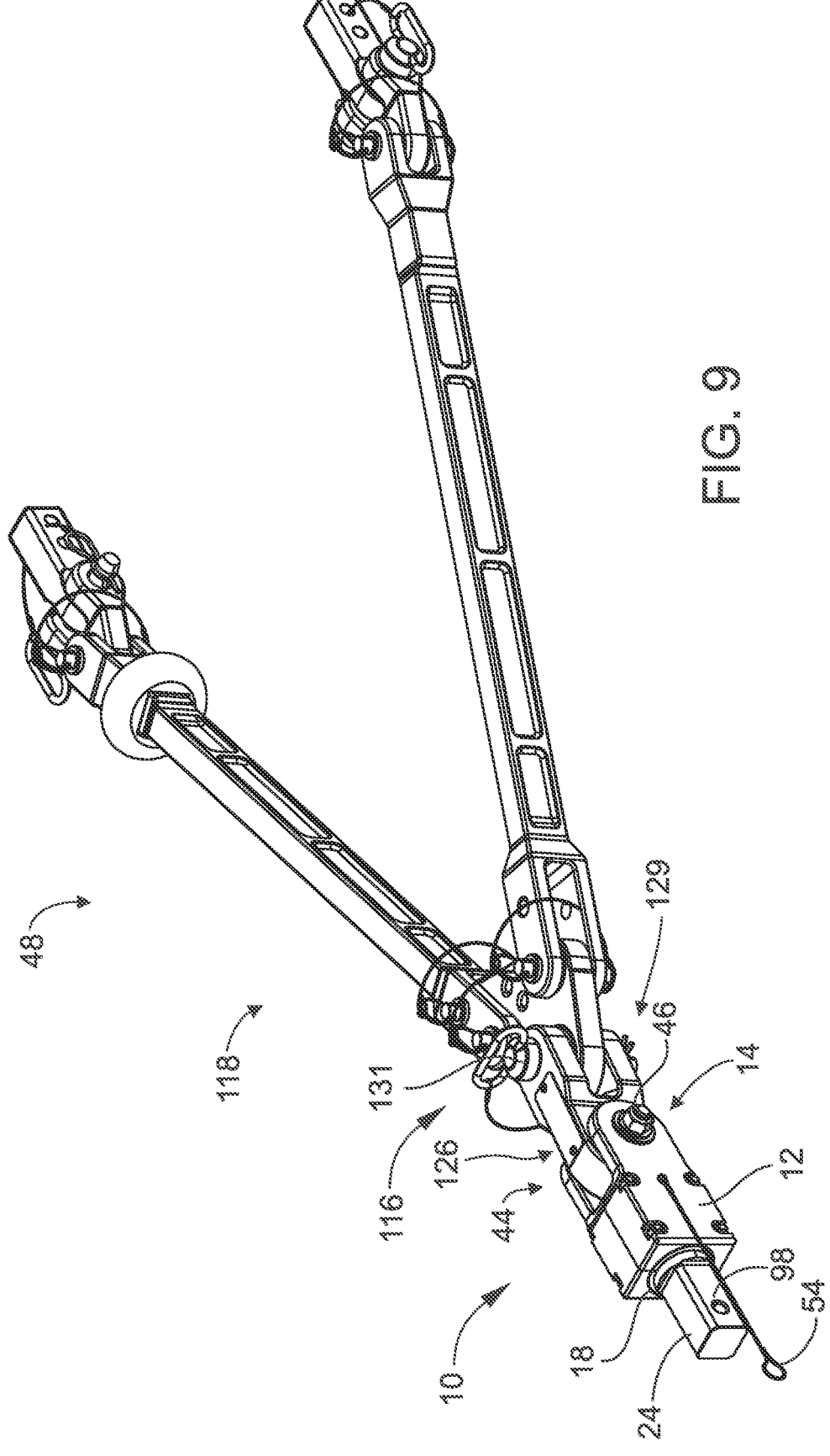
FIG. 9 is a rear, top, left perspective view of the disclosed high articulation towing receiver according to select embodiments of the instant disclosure in use with a high articulation tow bar according to select embodiments of the instant disclosure.

Referring to FIGS. 1-8, and as best shown in the partially disassembled view of FIG. 8, in select embodiments of high articulation towing receiver 10, housing 12 may include two-piece assembly 32. Two-piece assembly 32 may have left housing side piece 34 and right housing side piece 36. Left housing side piece 34 and right housing side piece 36 may be attached together. Left housing side piece 34 and right housing side piece 36 may be attached together by any means, including any mechanical fasteners, welding, adhesives, combinations thereof, or the like. In select embodiments, as shown in the Figures, two-piece assembly 32 of housing 12 may include four socket head cap screws 38 and four nylon lock nuts 40 configured to secure left housing side piece 34 to right housing side piece 36 with rotational component 28 secured inside of opening 18 on back end 20 of housing 12. However, the disclosure is not so limited, and housing 12 may be an integrally formed housing and/or it may be multiple pieces connected together by various means or mechanisms. Housing 12 may be made of any desirable material configured for supporting high articulation towing receiver 10. In select possibly preferred embodiments, housing 12 can be made from high strength aluminum material 42, as shown in the Figures.

Referring now to FIGS. 1-9, another feature of high articulation towing receiver 10 may be that hitch component 14 on front end 16 of housing 12 may be first clamshell clevis hitch 44. However, the disclosure is not so limited, and hitch component 14 of high articulation towing receiver 10 may be other types of hitch components, including but not limited to, a hitch ball, a pintle hitch, a weight distribution hitch, the like, other types of hitch types, etc. First clamshell clevis hitch 44, as shown herein, may include first removable clevis pin 46 configured for attachment of high articulation towing receiver 10 to a variety of different accessories, including, but not limited to, tow bar assembly 48. First removable clevis pin 46 may be any size or type of clevis pin desired for high articulation towing receiver 10. In select embodiments, first removable clevis pin 46 may include first diameter 50 (see FIG. 8) that may be 1 inch. In other select embodiments, first removable clevis pin 46 may be made from steel material 52 (see FIG. 8). First removable clevis pin 46 may be any style of removable pin, including, but not limited to a lock nut secured clevis pin (as shown herein), a lynch pin secured clevis pin, the like, etc.

Referring still to FIGS. 1-9, in select embodiments of disclosed high articulation towing receiver 10, double clevis connector piece 126 may be included. Double clevis connector piece 126 may have proximal end 128 and distal end 130. Double clevis connector piece 126 may include connector hole 127 on proximal end 128. Connector hole 127 may be configured to receive first removable clevis pin 46 for rotatable attachment to front end 16 of housing 12. Second clamshell clevis hitch 129 may be on distal end 130 of double clevis connector piece 126. Second clamshell clevis hitch 129 may include second removable clevis pin 131. Second clamshell clevis hitch 129 may be configured for attachment of high articulation towing receiver 10 to a variety of different accessories, including, but not limited to, tow bar assembly 48 (as shown in FIGS. 9-13) via second removable clevis pin 131. Second removable clevis pin 131 may be any size or type of clevis pin desired for high articulation towing receiver 10. In select embodiments, second removable clevis pin 131 may include second diameter 132 that may be 1 inch. Second removable clevis pin 131 may be made from steel material 52 (see FIG. 8). Double clevis connector piece 126 may be configured to position second removable clevis pin 131 perpendicular to first removable clevis pin 46. Wherein, double clevis connector piece 126 may be configured to provide second range of motion 134 about first removable clevis pin 46 (see FIGS. 11, 12D and 12E. Double clevis connector piece 126 may also be configured to provide third range of motion 135 about second removable clevis pin 131 (see FIGS. 10, 12A, 12B and 12C).

Referring to FIGS. 10-14, one feature of high articulation towing receiver 10 may be that it can be configured to provide first range of motion 124 directed along vehicle's longitudinal axis 104, second range of motion 134 about first removable clevis pin 46, and third range of motion 135 about second removable clevis pin 131. Whereby, vehicle 106 being towed can articulate across laterally severe and uneven terrain 108 without inducing stress and strain on either vehicle 106 being towed or towing vehicle 110. In select embodiments, high articulation towing receiver 10 may be configured to provide roll rotation 136, yaw rotation 137, and pitch rotation 140. Roll rotation 136 (best shown in FIGS. 12F, 13A, 13B, 13C, 14A, 14B and 14C) may be about central longitudinal axis 125 of receiver piece 22. As such, roll rotation 136 may be provided by first range of motion 124 of rotational component 28 of receiver piece 22 rotating within housing 12 for providing rotational movements 143 (see FIGS. 13A, 13B, 13C, 14A, 14B and 14C). Yaw rotation 137 may be along longitudinal vertical plane 138 of towing vehicle 110 (best shown in FIGS. 12A, 12B and 12C). As such, yaw rotation 137 may be provided by second range of motion 134 about first removable clevis pin 46 or via third range of motion 135 about second removable clevis pin 131 (depending on orientation of housing 12 about receiver piece 22) for movements 139 side to side of the vehicle 110 being towed. Pitch rotation 140 may be along longitudinal horizontal plane 141 of towing vehicle 110 via second range of motion 134 about first removable clevis pin 46 or via third range of motion 135 about second removable clevis pin 131 (depending on orientation of housing 12 about receiver piece 22) for movements 142 up and down of vehicle 106 being towed. In select embodiments, high articulation towing receiver 10 may provide an unlimited roll rotation 136, at least 100 degrees of yaw rotation 137, at least 100 degrees of pitch rotation 140, and/or combinations thereof. In select possibly preferred embodiments, high articulation towing receiver 10 may provide an unlimited roll rotation 136, at least 200 degrees of the yaw rotation 137, at least 200 degrees of pitch rotation 140, and/or combinations thereof.

Referring now to FIGS. 1-9 again, in select embodiments of high articulation towing receiver 10 an optional first lanyard 54 may be included. First lanyard 54 may be attached anywhere on housing 12 of high articulation towing receiver 10, including, but not limited to, on side 56 of housing 12, as shown herein. First lanyard 54 may be configured to be attached to first removable clevis pin 46 for preventing first removable clevis pin 46 from being lost when removed.

Still referring to FIGS. 1-9, in select embodiments of high articulation towing receiver 10 an optional second lanyard 144 may be included. Second lanyard 144 may be attached to top handle 145 on second removable clevis pin 131. Second lanyard 144 may be configured to be attached to cottar pin 146 on second removable clevis pin 131 to prevent cottar pin 146 from being lost when removed.

Referring now to FIGS. 6-8, another feature of high articulation towing receiver 10 may be that opening 18 on back end 20 of housing 12 may be in communication with interior 58 of housing 12. Interior 58 of housing 12 may be sized and shaped to house rotational component 28 of receiver piece 22 with bearing assembly 62 positioned therearound. Interior 58 may thus include locating feature shape 60 configured to accurately encapsulate rotational component 28 of receiver piece 22 and bearing assembly 62. Bearing assembly 62 may be configured to support axial and tension loads 64 (see FIGS. 10-12) imparted on high articulation towing receiver 10. Bearing assembly 62 may also be configured for support of compressive load 66 of high articulation towing receiver 10 (see FIGS. 10-12). In select embodiment of high articulation towing receiver 10, bearing assembly 62 may include split composite bearing 68, as best shown in FIG. 8. Split composite bearing 68 may be configured to support axial and tension loads 64 imparted on high articulation towing receiver 10 (see FIGS. 10-12). In select embodiment of high articulation towing receiver 10, bearing assembly 62 may include composite planar bearing disc 70, as best shown in FIG. 8. Composite planar bearing disc 70 may be configured for support of compressive load 66 of high articulation towing receiver 10 (see FIGS. 10-12). In other select embodiments of high articulation towing receiver 10, bearing assembly 62 may include split composite bearing 68 and composite planar bearing disc 70. Split composite bearing 68 may be configured to support axial and tension loads 64 imparted on high articulation towing receiver 10 while composite planar bearing disc 70 may be configured for support of compressive load 66 of high articulation towing receiver 10. Wherein, with use of composite materials, bearing assembly 62 may be configured to function effectively in dirty, sandy environments 72 without the need for cleaning, greasing or any means of lubrication. Whereby, bearing assembly 62 may be configured to act as low friction, high strength rotational support 74 for high articulation towing receiver 10.

Referring again specifically to FIGS. 6-8, rotational component 28 of receiver piece 22 and bearing assembly 62 may include a stepped configuration configured to withstand extremely high tensile and compressive forces. In select embodiments, rotational component 28 of receiver piece 22 may include first rotating diameter section 76, second rotating diameter section 78, and third rotating diameter section 80. First rotating diameter section 76 may step down into second rotating diameter section 78. Second rotating diameter section 78 may step up into third rotating diameter section 80. Wherein, second rotating diameter section 78 may be smaller than first rotating diameter section 76 and third rotating diameter section 80. Likewise, in select embodiments, bearing assembly 62 may include first bearing diameter section 82, second bearing diameter section 84, and third bearing diameter section 86. First bearing diameter section 82 may step down into second bearing diameter section 84. Second bearing diameter section 84 may step up into third bearing diameter section 86. Wherein, second bearing diameter section 84 may be smaller than first bearing diameter section 82 and third bearing diameter section 86. First bearing diameter section 82 and second bearing diameter section 84 may be positioned around second rotating diameter section 78 of rotational component 28 of receiver piece 22. Third bearing diameter section 86 may be positioned around third rotating diameter section 80 of rotational component 28 of receiver piece 22. In select embodiments, opening 18 on housing 12 may include first opening diameter section 88. First opening diameter section 88 may secure first bearing diameter section 82 around second rotating diameter section 78. In select embodiments, first rotating diameter section 76 of rotational component 28 may be sized larger than opening 18 on housing 12 and may be positioned outside of opening 18 on housing 12. In select embodiments, interior 58 of housing 12 may include second opening diameter section 90 and third opening diameter section 92. Second opening diameter section 90 may be stepped in from first opening diameter section 88 in opening 18 of housing 12. Third opening diameter section 92 may be stepped out from second opening diameter section 90. Second opening diameter section 90 may secure second bearing diameter section 84 around second rotating diameter section 78. Third opening diameter section 92 may secure third bearing diameter section 86 around third rotating diameter section 80.

Figures 10, 11:
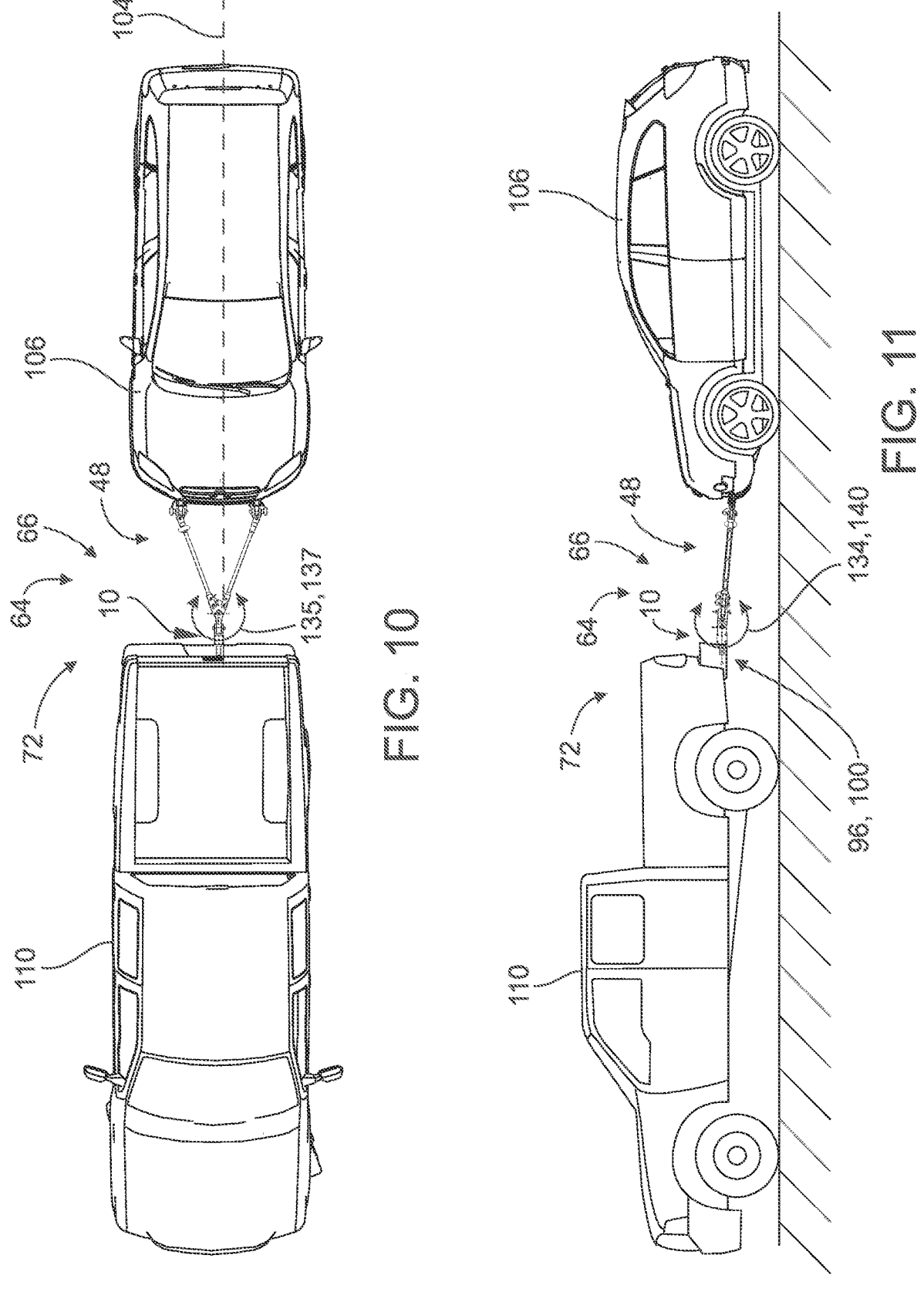
FIG. 10 is a top environmental view of the high articulation towing receiver according to select embodiments of the instant disclosure in use on a pickup-truck with a high articulation tow bar attached thereto for towing a car.
FIG. 11 is a side view of the high articulation towing receiver in use as shown in FIG. 10.
Figures 12A, 12B, 12C:
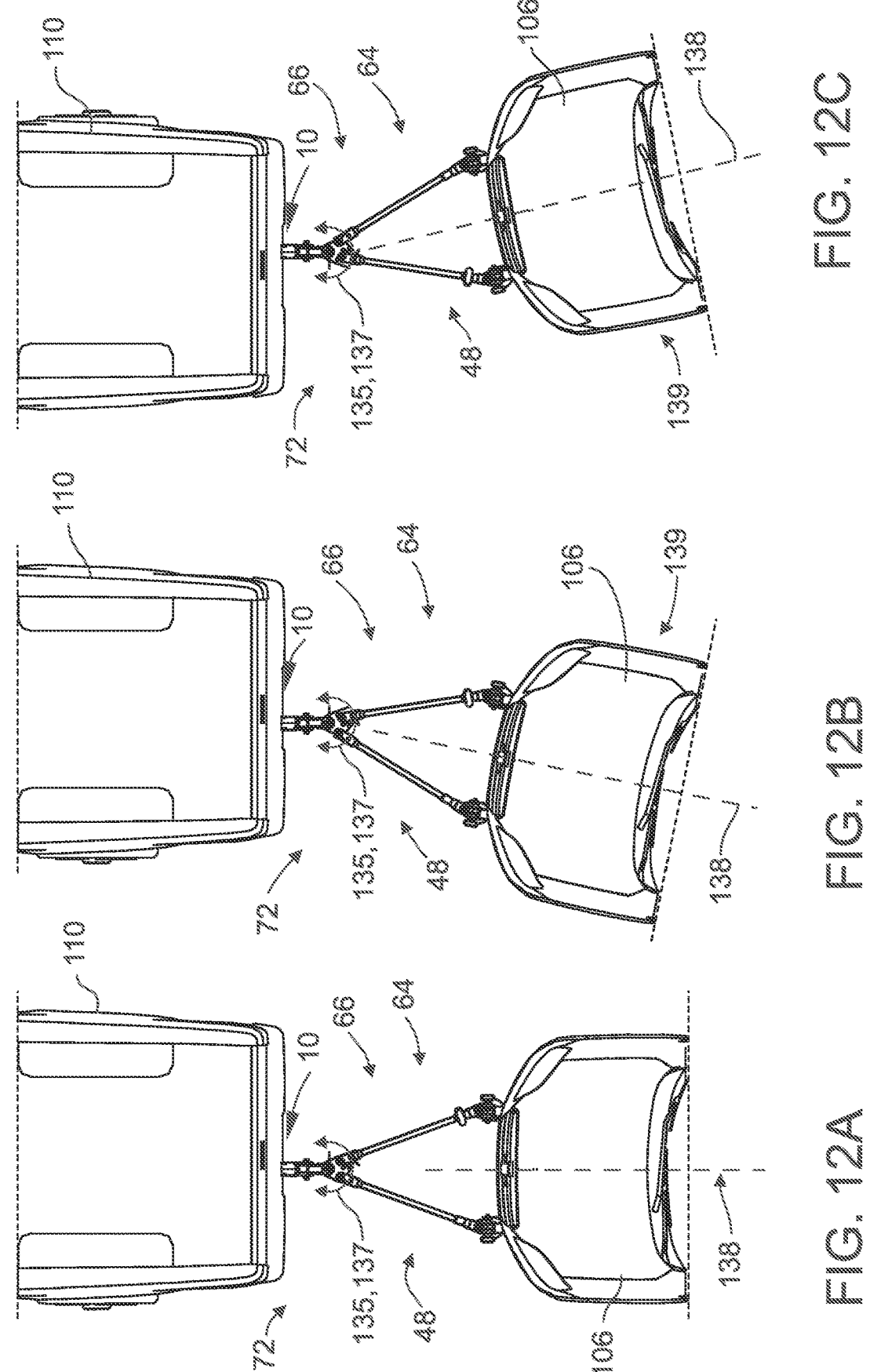
FIG. 12A is a top view of the high articulation towing receiver in use as shown in FIG. 10 showing the standard towing position.
FIG. 12B is a top view of the high articulation towing receiver in use as shown in FIG. 10 showing the horizontal range of motion to the left.
FIG. 12C is a top view of the high articulation towing receiver in use as shown in FIG. 10 showing the horizontal range of motion to the right.
Figures 12D, 12E:
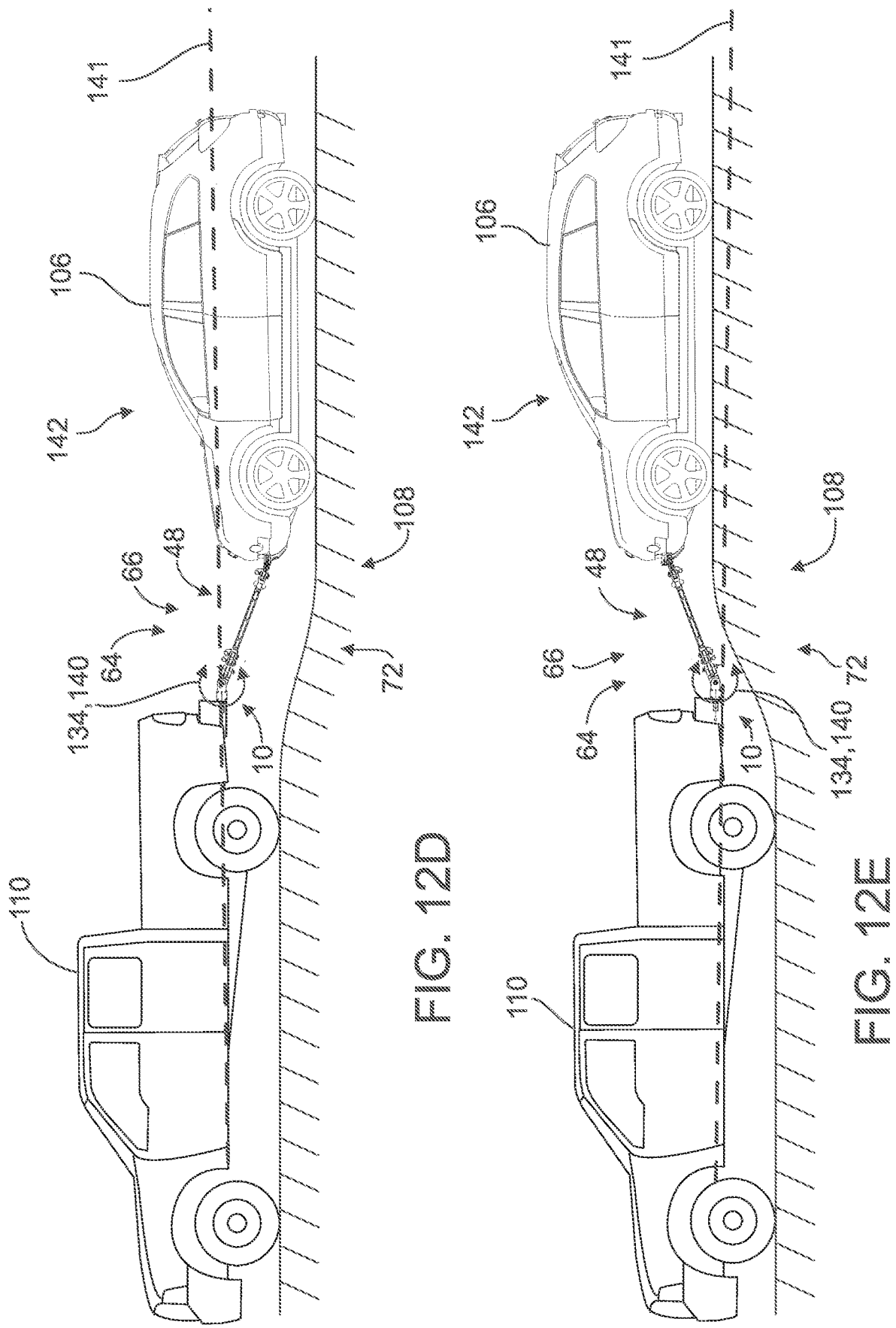
FIG. 12D is a top view of the high articulation towing receiver in use as shown in FIG. 10 showing the vertical range of motion downward.
FIG. 12E is a side view of the high articulation towing receiver in use as shown in FIG. 10 showing the vertical range upward.
Figure 12F:
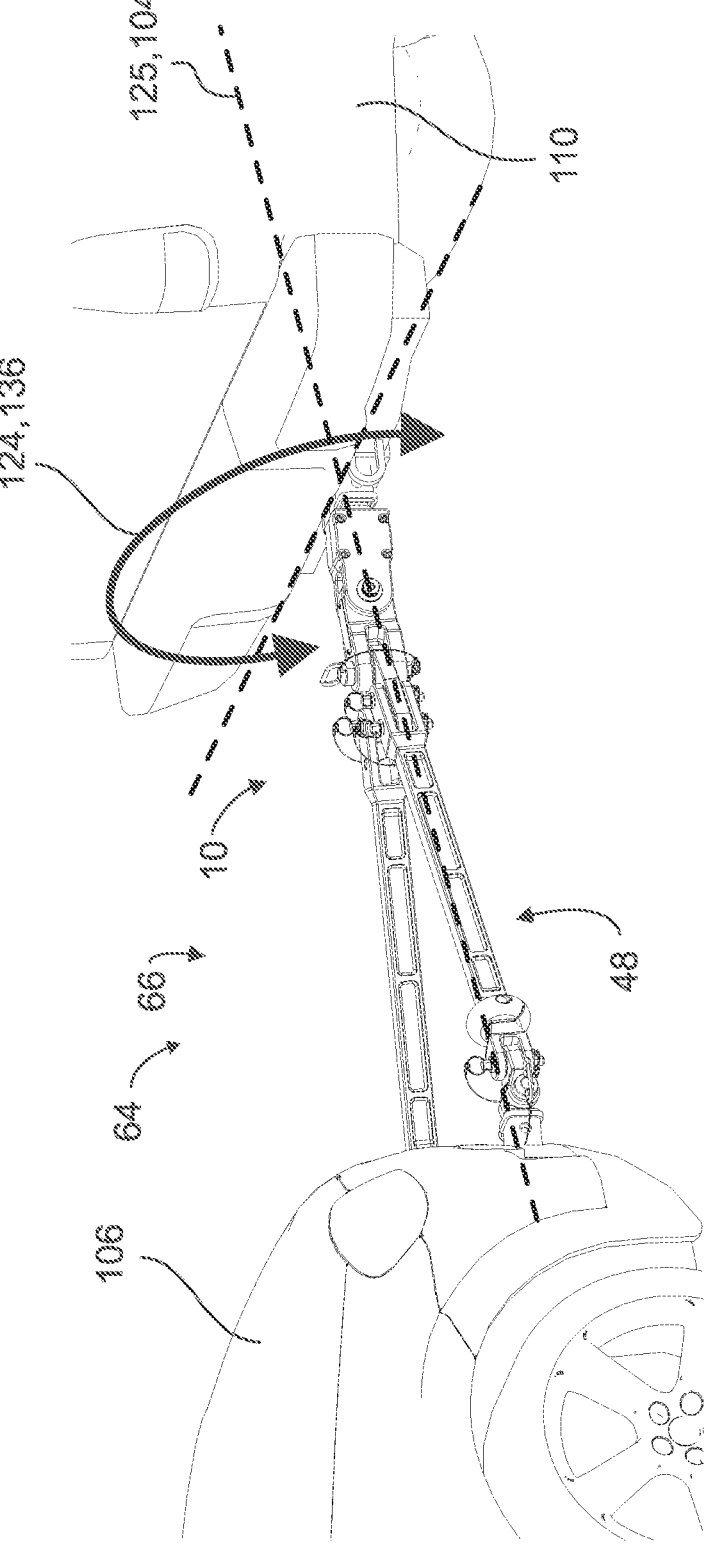
FIG. 12F is a zoomed in perspective view of the high articulation towing receiver in use as shown in FIG. 10 showing the roll rotation.
Figures 13A, 13B, 13C:
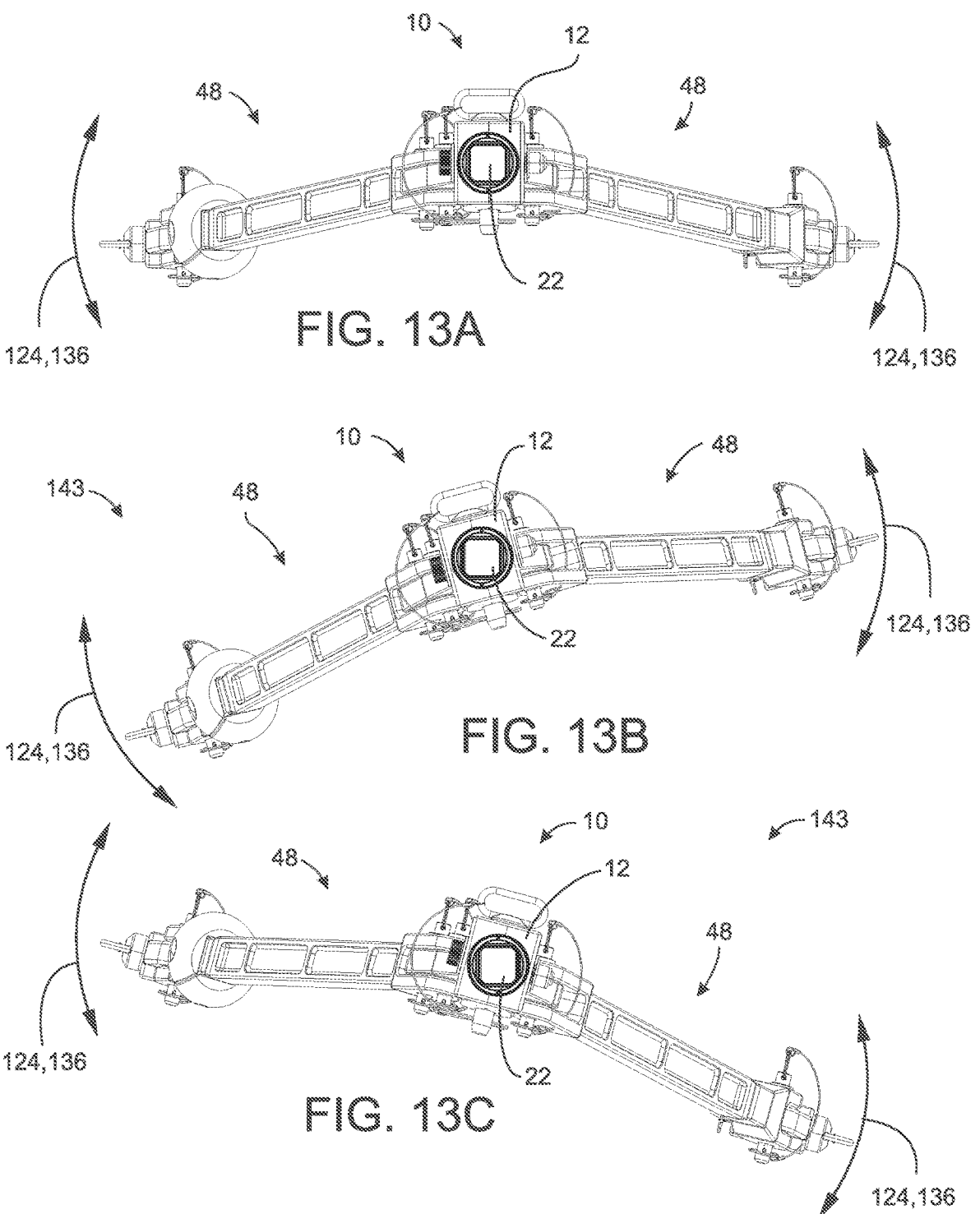
FIG. 13A is a back end view of the high articulation towing receiver in use as shown in FIG. 9 showing the roll rotation with the high articulation tow bar showing the first range of motion for providing the roll rotation.
FIG. 13B is another back end view of the high articulation towing receiver in use as shown in FIG. 9 showing the roll rotation with the high articulation tow bar showing the first range of motion for providing the roll rotation.
FIG. 13C is another back end view of the high articulation towing receiver in use as shown in FIG. 9 showing the roll rotation with the high articulation tow bar showing the first range of motion for providing the roll rotation.
Figures 14A, 14B, 14C:
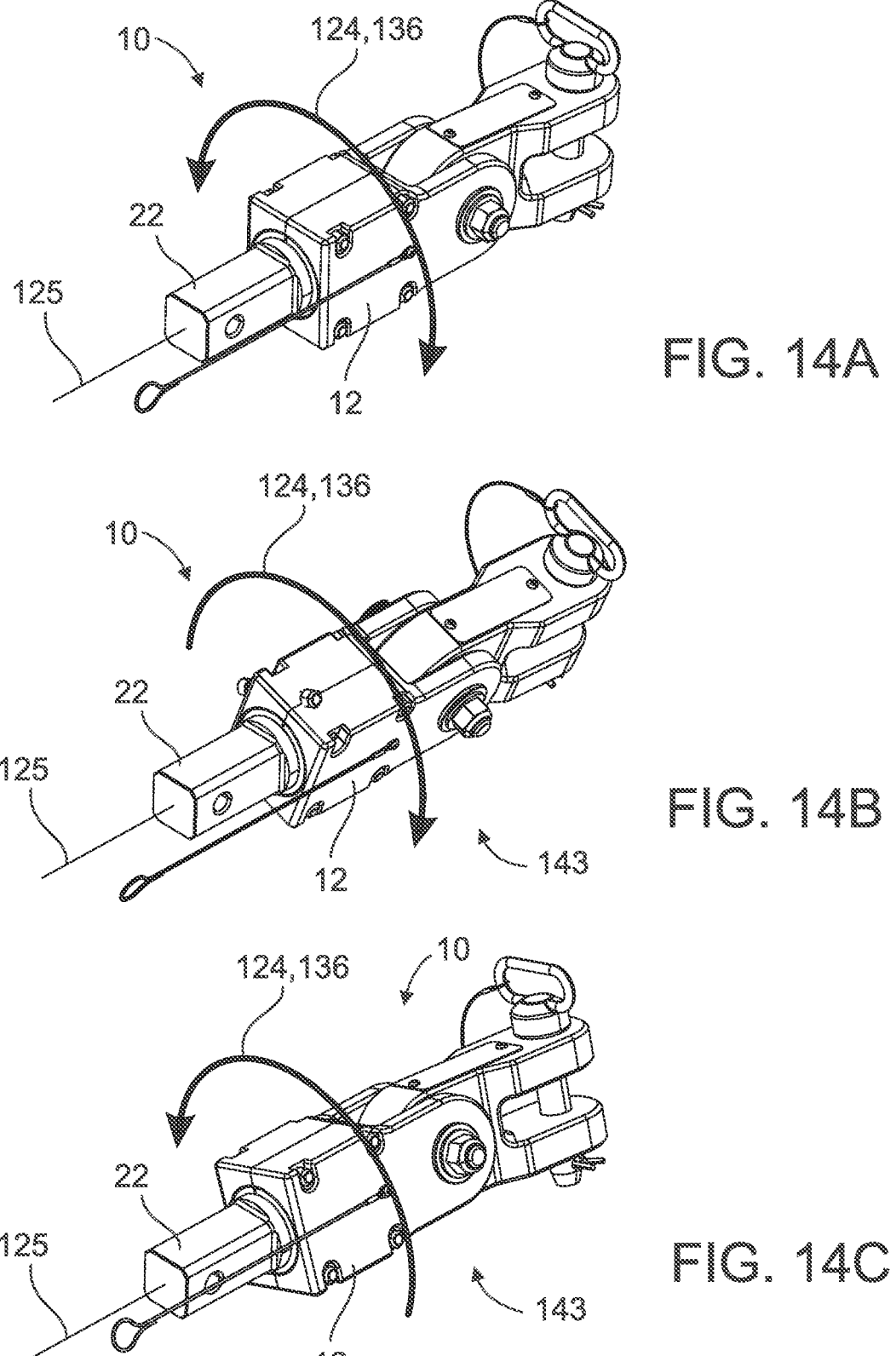
FIG. 14A is a perspective view of the high articulation towing receiver from FIG. 1 showing the first range of motion for providing the roll rotation.
FIG. 14B is a perspective view of the high articulation towing receiver from FIG. 1 showing the first range of motion for providing the roll rotation.
FIG. 14C is a perspective view of the high articulation towing receiver from FIG. 1 showing the first range of motion for providing the roll rotation.

Referring now to FIGS. 10-12, another feature of high articulation towing receiver 10 may be that hitch receiver portion 24 of receiver piece 22 may be configured to be inserted and secured into receiver tube, like any standard receiver tube 96, any custom receiver tube, or the like. As an example, and clearly not limited thereto, hitch receiver portion 24 of receiver piece 22 may include 2-inch square shape 98 (see FIG. 8) configured to be inserted into standard 2-inch receiver tube 100. Receiver piece 22 may be made of any desired material for supporting high articulation towing receiver 10. In select possibly preferred embodiments of high articulation towing receiver 10, receiver piece 22 can be made from high strength Cr—Mo steel material 94, or the like.

Another feature of high articulation towing receiver 10 in use is that high articulation towing receiver 10 may be configured to function maintenance free with no bearing requiring lubrication or regular cleaning and grease to prevent premature wear and failure.

Still referring to FIGS. 9-12, in use, high articulation towing receiver 10 may be configured to withstand extremely high tensile and compressive forces by virtue of stepped rotational component 28 as part of high strength steel receiver 112 (see FIG. 8) and accompanying high strength composite bearing 114 (see FIG. 8).

Still referring to FIGS. 9-12, in use, high articulation towing receiver 10 may be configured to connect with towed vehicles (like vehicle being towed 106) and trailers through quick-pin clevis connection 116. Quick-pin clevis connection 116 may be configured to allow connection to a variety of tow bar adapters 118 to increase the towed vehicle degrees of freedom required for a particular towing application. Quick-pin clevis connection 116 may be provided with first removable clevis pin 46 and/or second removable clevis pin 131 (as shown in the FIGS). First removable clevis pin 46 may include a bolted clevis pin. The use of this bolted clevis pin for removable clevis pin 46 (as shown in the Figures), may provide needed strength for first clamshell clevis hitch 44. In select possibly preferred embodiments, second removable clevis pin 131 may be the quick-pin clevis connection 116. In these embodiments, second removable clevis pin 131 may include top handle 145 on one side of second removable clevis pin 131 for easily manipulating second removable clevis pin 131 in and out of second clamshell clevis hitch 129. Cottar pin 146 may be included on the other side of second removable clevis pin 131 for securing second removable clevis pin 131 inside of second clamshell clevis hitch 129. Second lanyard 144 may be attached between top handle 145 and cottar pin 146 for preventing cottar pin 146 for being lost.

In sum, in accordance with at least selected embodiments, the instant disclosure may address at least certain aspects of the above-mentioned needs, issues and/or problems and may provide high articulation towing receiver 10. See FIGS. 1-8. As shown in the Figures, the disclosed high articulation towing receiver 10 may be designed and configured with an ability to provide complete rotation along the vehicle's longitudinal axis 104, so that a vehicle 106 being towed can articulate across laterally severe/uneven terrain without inducing stress and strain on either the vehicle being towed or a towing vehicle.

One feature of the disclosed high articulation towing receiver 10 may be the ability to provide 200 degrees of rotation (±100°) along a longitudinal plane of the towing vehicle, whereby the vehicle being towed can articulate across longitudinally severe/uneven terrain without inducing stress and strain on either the vehicle being towed or a towing vehicle.

Another feature of the disclosed high articulation towing receiver 10 may be that it can be configured with an ability to function maintenance free. Whereby, the need for regular maintenance required with alternative designs that incorporate bearings and lubrication including, but not limited to, regular cleaning and grease to prevent premature wear and failure, may be reduced and/or eliminated.

Another feature of the disclosed high articulation towing receiver 10 may be the inclusion of composite bearing material of composite bearing assembly 62. The composite bearing material may be configured to function effectively in dirty, sandy environments without the need for cleaning, greasing or any means of lubrication. Whereby, the composite bearing assembly 62 may be configured to act as a low friction, high strength rotational support for the high articulation towing receiver 10.

Another feature of the disclosed high articulation towing receiver 10 may be the ability to withstand extremely high tensile and compressive forces by virtue of a stepped rotational component 28 as part of a high strength steel receiver piece 22 and an accompanying high strength composite bearing assembly 62.

Another feature of the disclosed high articulation towing receiver 10 may be the ability to connect with towed vehicles and trailers through quick-pin clevis connection 116. The quick-pin clevis connection 116 may be configured to allow connection to a variety of tow bar adapters 118 to increase the towed vehicle degrees of freedom (DOF) required for a particular towing application.

The purpose of the disclosed high articulation towing receiver 10 may be to solve the limitation of a standard ball and hitch receiver, wherein the towed vehicle has a minimal range of motion along the longitudinal axis when coupled with a tow vehicle. This minimal range of motion for standard ball and hitch receivers may lead to stresses and failures in towing equipment during various situations, including, but not limited to, utilizing a tow bar in off-road environments. In these types of off-road environments, the torsional forces applied to the tow bar from the towing vehicle being on one axis or plain, and the towed vehicle being on another axis or plane can create extreme torsional forces on the tow bar which may lead to stresses and eventual failure of the tow bar and/or attaching equipment.

As a result, the instant disclosure may be designed to address at least certain aspects of the problems or needs discussed above by providing of high articulation towing receiver 10. The disclosed high articulation towing receiver 10 may provide 360-degree axial rotation and ±100°, preferably 200° of horizontal and vertical articulation along the vehicle's longitudinal axis to solve this problem.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A high articulation towing receiver comprising:
   a housing, the housing having a hitch component on a front end and an opening on a back end, wherein the housing including a two-piece assembly, the two-piece assembly including a left housing side piece and a right housing side piece attached together, wherein the two-piece assembly of the housing including:
   four socket head cap screws and four nylon lock nuts configured to secure the left housing side piece to the right housing side piece with the rotational component secured inside of the opening on the back end of the housing;
   a receiver piece, the receiver piece including a hitch receiver portion on a first end and a rotational component on a second end; and
   the rotational component of the receiver piece is positioned inside of the opening on the back end of the housing, where the rotational component is configured to rotate within the housing for providing a first range of motion about a central longitudinal axis of the receiver piece.

2. The high articulation towing receiver of claim 1, wherein the housing is made from a high strength aluminum material.

3. The high articulation towing receiver of claim 1, wherein the hitch component on the front end of the housing includes a first clamshell clevis hitch, the first clamshell clevis hitch including a first removable clevis pin, wherein the first removable clevis pin includes a first diameter being 1 inch and is made from a steel material.

4. The high articulation towing receiver of claim 3 further comprising a double clevis connector piece with a proximal end and a distal end, the double clevis connector piece including:
   a connector hole on the proximal end of the double clevis connector piece, the connector hole is configured to receive the first removable clevis pin for rotatable attachment to the front end of the housing;
   a second clamshell clevis hitch on the distal end of the double clevis connector piece, the second clamshell clevis hitch including a second removable clevis pin, the second clamshell clevis hitch is configured for attachment of the high articulation towing receiver to a tow bar assembly via the second removable clevis pin, the second removable clevis pin includes a second diameter being 1 inch and is made from the steel material; and
   the double clevis connector piece is configured to position the second removable clevis pin perpendicular to the first removable clevis pin;
   wherein, the double clevis connector piece is configured to provide:
   a second range of motion about the first removable clevis pin; and
   a third range of motion about the second removable clevis pin; and
   wherein, the high articulation towing receiver is configured to provide the first range of motion directed along a vehicle's longitudinal axis, the second range of motion about the first removable clevis pin, and the third range of motion about the second removable clevis pin, whereby a vehicle being towed can articulate across a laterally severe and uneven terrain without inducing stress and strain on either the vehicle being towed or a towing vehicle.

5. The high articulation towing receiver according to claim 4, wherein the high articulation towing receiver provides:
   a roll rotation about the central longitudinal axis of the receiver piece via the first range of motion of the rotational component of the receiver piece rotating within the housing;
   a yaw rotation along a longitudinal vertical plane of the towing vehicle via the second range of motion about the first removable clevis pin or via the third range of motion about the second removable clevis pin for movements side to side of the vehicle being towed; and
   a pitch rotation along a longitudinal horizontal plane of the towing vehicle via the second range of motion about the first removable clevis pin or via the third range of motion about the second removable clevis pin for movements up and down of the vehicle being towed.

6. The high articulation towing receiver according to claim 5, wherein the high articulation towing receiver provides:
   at least 100 degrees of the yaw rotation;
   at least 100 degrees of the pitch rotation; and
   combinations thereof.

7. The high articulation towing receiver of claim 4 further including:
   a first lanyard, the first lanyard is attached on a side of the housing, the first lanyard is configured to be attached to the first removable clevis pin for preventing the removable clevis pin from being lost when removed; and
   a second lanyard, the second lanyard is attached to a top handle on the second removable clevis pin, the second lanyard is configured to be attached to a cottar pin on the second removable clevis pin to prevent the cottar pin from being lost when removed.

8. The high articulation towing receiver of claim 1, wherein the opening on the back end of the housing is in communication with an interior of the housing, the interior of the housing including a locating feature shape configured to accurately encapsulate the rotational component of the receiver piece and a bearing assembly.

9. The high articulation towing receiver of claim 8, wherein the bearing assembly is configured to support axial and tension loads imparted on the high articulation towing receiver, and the bearing assembly is configured for support of compressive load of the high articulation towing receiver.

10. The high articulation towing receiver of claim 9, wherein the bearing assembly includes a split composite bearing configured to support axial and tension loads imparted on the high articulation towing receiver.

11. The high articulation towing receiver of claim 9, wherein the bearing assembly includes a composite planar bearing disc configured for support of compressive load of the high articulation towing receiver.

12. The high articulation towing receiver of claim 9, wherein the bearing assembly includes:
   a split composite bearing configured to support axial and tension loads imparted on the high articulation towing receiver;
   a composite planar bearing disc configured for support of compressive load of the high articulation towing receiver; and
   wherein, the bearing assembly is configured to function effectively in dirty, sandy environments without the need for cleaning, greasing or any means of lubrication, whereby the bearing assembly is configured to act as a low friction, high strength rotational support for the high articulation towing receiver.

13. The high articulation towing receiver of claim 8, wherein:
   the rotational component of the receiver piece including a first rotating diameter section that steps down into a second rotating diameter section that steps up into a third rotating diameter section, where the second rotating diameter section is smaller than the first rotating diameter section and the third rotating diameter section;
   the bearing assembly including a first bearing diameter section that steps down into a second bearing diameter section that steps up into a third bearing diameter section, where the second bearing diameter section is smaller than the first bearing diameter section and the third bearing diameter section, the first bearing diameter section and the second bearing diameter section are positioned around the second rotating diameter section, and the third bearing diameter section is positioned around the third rotating diameter section;

the opening on the housing including first opening diameter section that secures the first bearing diameter section around the second rotating diameter section;

the first rotating diameter section of the rotational component is sized larger than the opening on the housing and is positioned outside of the opening on the housing; and the interior of the housing including a second opening diameter section stepped in from the first opening diameter section and a third opening diameter section that is stepped out from the second opening diameter section, the second opening diameter section secures the second bearing diameter section around the second rotating diameter section, and the third opening diameter section secures the third bearing diameter section around the third rotating diameter section.

14. The high articulation towing receiver of claim 1, wherein the receiver piece is made from a high strength Cr—Mo steel material.

15. The high articulation towing receiver of claim 1, wherein the hitch receiver portion of the receiver piece is configured to be inserted and secured into a standard receiver tube.

16. The high articulation towing receiver of claim 15, wherein the hitch receiver portion of the receiver piece includes a 2-inch square shape configured to be inserted into a standard 2-inch receiver tube.

17. The high articulation towing receiver of claim 1 configured with an ability to:

function maintenance free with no bearing requiring lubrication or regular cleaning and grease to prevent premature wear and failure;

withstand extremely high tensile and compressive forces by virtue of a stepped rotational component as part of a high strength steel receiver and an accompanying high strength composite bearing;

connect with towed vehicles and trailers through a quick-pin clevis connection, the quick-pin clevis connection is configured to allow connection to a variety of tow bar adapters to increase degrees of freedom of the towed vehicle required for a particular towing application; and combinations thereof.

18. A high articulation towing receiver comprising:

a housing, the housing having a hitch component on a front end and an opening on a back end, wherein the housing including a two-piece assembly, the two-piece assembly having a left housing side piece and a right housing side piece attached together, the housing is made from a high strength aluminum material, wherein the two-piece assembly of the housing including:

four socket head cap screws and four nylon lock nuts configured to secure the left housing side piece to the right housing side piece with the rotational component secured inside of the opening on the back end of the housing;

a receiver piece, the receiver piece including a hitch receiver portion on a first end and a rotational component on a second end, the receiver piece is made from a high strength Cr—Mo steel material;

the rotational component of the receiver piece is positioned inside of the opening on the back end of the housing, where the rotational component is configured to rotate within the housing, where the rotational component is configured to rotate within the housing for providing a first range of motion about a central longitudinal axis of the receiver piece;

the hitch component on the front end of the housing includes a clamshell clevis hitch, the clamshell clevis hitch including a first removable clevis pin, the first removable clevis pin includes a first diameter being 1 inch and is made from a steel material;

a double clevis connector piece with a proximal end and a distal end, the double clevis connector piece including:

a connector hole on the proximal end of the double clevis connector piece, the connector hole is configured to receive the first removable clevis pin for rotatable attachment to the front end of the housing;

a second clamshell clevis hitch on the distal end of the double clevis connector piece, the second clamshell clevis hitch including a second removable clevis pin, the second clamshell clevis hitch is configured for attachment of the high articulation towing receiver to a tow bar assembly via the second removable clevis pin, the second removable clevis pin includes a second diameter being 1 inch and is made from the steel material;

the double clevis connector piece is configured to position the second removable clevis pin perpendicular to the first removable clevis pin;

wherein, the double clevis connector piece is configured to provide:

a second range of motion about the first removable clevis pin;

a third range of motion about the second removable clevis pin;

wherein, the high articulation towing receiver is configured to provide the first range of motion directed along a vehicle's longitudinal axis, the second range of motion about the first removable clevis pin, and the third range of motion about the second removable clevis pin, whereby a vehicle being towed can articulate across a laterally severe and uneven terrain without inducing stress and strain on either the vehicle being towed or a towing vehicle;

wherein the high articulation towing receiver provides:

a roll rotation about the central longitudinal axis of the receiver piece via the first range of motion of the rotational component of the receiver piece rotating within the housing, the roll rotation is unlimited;

a yaw rotation along a longitudinal vertical plane of the towing vehicle via the second range of motion about the first removable clevis pin or via the third range of motion about the second removable clevis pin for movements side to side of the vehicle being towed, the yaw rotation is at least 100 degrees;

a pitch rotation along a longitudinal horizontal plane of the towing vehicle via the second range of motion about the first removable clevis pin or via the third range of motion about the second removable clevis pin for movements up and down of the vehicle being towed, the pitch rotation is at least 100 degrees;

a first lanyard, the first lanyard is attached on a side of the housing, the first lanyard is configured to be attached to the first removable clevis pin for preventing the removable clevis pin from being lost when removed;

a second lanyard, the second lanyard is attached to a top handle on the second removable clevis pin, the second lanyard is configured to be attached to a cottar pin on the second removable clevis pin to prevent the cottar pin from being lost when removed;

the opening on the back end of the housing is in communication with an interior of the housing, the interior of the housing including a locating feature shape configured to accurately encapsulate the rotational component of the receiver piece and a bearing assembly;

the bearing assembly is configured to support axial and tension loads imparted on the high articulation towing receiver, and the bearing assembly is configured for support of compressive load of the high articulation towing receiver, wherein the bearing assembly includes:

a split composite bearing configured to support axial and tension loads imparted on the high articulation towing receiver;

a composite planar bearing disc configured for support of compressive load of the high articulation towing receiver;

wherein, the bearing assembly is configured to function effectively in dirty, sandy environments without the need for cleaning, greasing or any means of lubrication, whereby the bearing assembly is configured to act as a low friction, high strength rotational support for the high articulation towing receiver;

wherein:

the rotational component of the receiver piece including a first rotating diameter section that steps down into a second rotating diameter section that steps up into a third rotating diameter section, where the second rotating diameter section is smaller than the first rotating diameter section and the third rotating diameter section;

the bearing assembly including a first bearing diameter section that steps down into a second bearing diameter section that steps up into a third bearing diameter section, where the second bearing diameter section is smaller than the first bearing diameter section and the third bearing diameter section, the first bearing diameter section and the second bearing diameter section are positioned around the second rotating diameter section, and the third bearing diameter section is positioned around the third rotating diameter section;

the opening on the housing including first opening diameter section that secures the first bearing diameter section around the second rotating diameter section;

the first rotating diameter section of the rotational component is sized larger than the opening on the housing and is positioned outside of the opening on the housing;

the interior of the housing including a second opening diameter section stepped in from the first opening diameter section and a third opening diameter section that is stepped out from the second opening diameter section, the second opening diameter section secures the second bearing diameter section around the second rotating diameter section, and the third opening diameter section secures the third bearing diameter section around the third rotating diameter section;

wherein the hitch receiver portion of the receiver piece includes a 2-inch square shape configured to be inserted into a standard 2-inch receiver tube;

whereby, the high articulation towing receiver is configured with an ability to:

provide rotation along a vehicle's longitudinal axis of at least 200 degrees of rotation along the longitudinal plane of the towing vehicle, whereby a vehicle being towed can articulate across a laterally severe and uneven terrain without inducing stress and strain on either the vehicle being towed or a towing vehicle;

to function maintenance free with no bearing requiring lubrication or regular cleaning and grease to prevent premature wear and failure;

to withstand extremely high tensile and compressive forces by virtue of a stepped rotational component as part of a high strength steel receiver and an accompanying high strength composite bearing; and to connect with towed vehicles and trailers through a quick-pin clevis connection, the quick-pin clevis connection is configured to allow connection to a variety of tow bar adapters to increase degrees of freedom of the towed vehicle required for a particular towing application.

19. A high articulation towing receiver comprising:

a housing, the housing having a hitch component on a front end and an opening on a back end;

a receiver piece, the receiver piece including a hitch receiver portion on a first end and a rotational component on a second end;

the rotational component of the receiver piece is positioned inside of the opening on the back end of the housing, where the rotational component is configured to rotate within the housing for providing a first range of motion about a central longitudinal axis of the receiver piece;

the hitch component on the front end of the housing includes a first clamshell clevis hitch, the first clamshell clevis hitch including a first removable clevis pin, wherein the first removable clevis pin includes a first diameter being 1 inch and is made from a steel material;

a double clevis connector piece with a proximal end and a distal end, the double clevis connector piece including:

a connector hole on the proximal end of the double clevis connector piece, the connector hole is configured to receive the first removable clevis pin for rotatable attachment to the front end of the housing;

a second clamshell clevis hitch on the distal end of the double clevis connector piece, the second clamshell clevis hitch including a second removable clevis pin, the second clamshell clevis hitch is configured for attachment of the high articulation towing receiver to a tow bar assembly via the second removable clevis pin, the second removable clevis pin includes a second diameter being 1 inch and is made from the steel material; and the double clevis connector piece is configured to position the second removable clevis pin perpendicular to the first removable clevis pin;

wherein, the double clevis connector piece is configured to provide:

a second range of motion about the first removable clevis pin; and a third range of motion about the second removable clevis pin; and wherein, the high articulation towing receiver is configured to provide the first range of motion directed along a vehicle's longitudinal axis, the second range of motion about the first removable clevis pin, and the third range of motion about the second removable clevis pin, whereby a vehicle being towed can articulate across a laterally severe and uneven terrain without inducing stress and strain on either the vehicle being towed or a towing vehicle.

20. A high articulation towing receiver comprising:

a housing, the housing having a hitch component on a front end and an opening on a back end;

a receiver piece, the receiver piece including a hitch receiver portion on a first end and a rotational component on a second end;

the rotational component of the receiver piece is positioned inside of the opening on the back end of the housing, where the rotational component is configured to rotate within the housing for providing a first range of motion about a central longitudinal axis of the receiver piece; and wherein the opening on the back end of the housing is in communication with an interior of the housing, the interior of the housing including a locating feature shape configured to accurately encapsulate the rotational component of the receiver piece and a bearing assembly.

21. A high articulation towing receiver comprising:

a housing, the housing having a hitch component on a front end and an opening on a back end;

a receiver piece, the receiver piece including a hitch receiver portion on a first end and a rotational component on a second end;

the rotational component of the receiver piece is positioned inside of the opening on the back end of the housing, where the rotational component is configured to rotate within the housing for providing a first range of motion about a central longitudinal axis of the receiver piece; and wherein, the high articulation towing receiver is configured with an ability to:

function maintenance free with no bearing requiring lubrication or regular cleaning and grease to prevent premature wear and failure;

withstand extremely high tensile and compressive forces by virtue of a stepped rotational component as part of a high strength steel receiver and an accompanying high strength composite bearing;

connect with towed vehicles and trailers through a quick-pin clevis connection, the quick-pin clevis connection is configured to allow connection to a variety of tow bar adapters to increase degrees of freedom of the towed vehicle required for a particular towing application;

and combinations thereof.

* * * * *